US012066169B2

(12) United States Patent
Fenger

(10) Patent No.: US 12,066,169 B2
(45) Date of Patent: Aug. 20, 2024

(54) WIRE-FRAME AND FIBERGLASS HOLIDAY MOTIF

(71) Applicant: MK THEMED ATTRACTIONS PH. INC., Angeles (PH)

(72) Inventor: Mathias Fenger, Pampanga (PH)

(73) Assignee: MK THEMED ATTRACTIONS PH. INC., Angeles (PH)

( * ) Notice: Subject to any disclaimer, the term of this patent is extended or adjusted under 35 U.S.C. 154(b) by 0 days.

(21) Appl. No.: 17/577,706

(22) Filed: Jan. 18, 2022

(65) Prior Publication Data

US 2023/0228405 A1 Jul. 20, 2023

(51) Int. Cl.
*F21V 19/00* (2006.01)
*A47G 33/00* (2006.01)
*F21W 121/00* (2006.01)

(52) U.S. Cl.
CPC ............ *F21V 19/007* (2013.01); *A47G 33/00* (2013.01); *F21W 2121/00* (2013.01)

(58) Field of Classification Search
CPC .. F21S 4/15; F21S 4/26; F21V 19/007; F21W 2121/00; Y10S 362/806; Y10S 362/808
See application file for complete search history.

(56) References Cited

U.S. PATENT DOCUMENTS 998,952 A 7/1911 Boone
2,176,117 A 10/1939 Belknap et al.
2,624,967 A 1/1953 Phillippi
3,400,263 A 9/1968 Yakim
5,785,792 A 7/1998 Locke et al.
5,813,747 A * 9/1998 Kale .................... F21V 17/164 362/249.14
5,955,156 A 9/1999 Hermanson
5,968,613 A * 10/1999 Lin .......................... F21S 4/10 428/7
6,273,584 B1 * 8/2001 Wang ..................... F21S 6/001 362/431
6,284,330 B1 9/2001 Hermanson
6,579,578 B1 5/2003 Li
6,719,440 B1 4/2004 Wang
(Continued)

FOREIGN PATENT DOCUMENTS

CN 2826154 Y 10/2006
CN 2830873 Y 10/2006
(Continued)

*Primary Examiner* — Zheng Song
(74) *Attorney, Agent, or Firm* — ARCHER & GREINER, P.C.; Gregory J. Winsky; John M. Paolino

(57) ABSTRACT

A wire-frame and fiberglass holiday motif has multiple pinpoint lights secured and arranged on a wire frame so as to convey a three-dimensional form of the holiday motif. In addition, one or more molded fiberglass portions have been secured to the wire frame and present an outer surface corresponding to an expressive feature of the holiday motif, such as a face. The thickness of the fiberglass has been selected such that it becomes translucent when illuminated by a subset of the pinpoint lights at night proximate to such fiberglass portions. The combination of planar surfaces defined by a pattern of pinpoint lights visible to the user, and one or more portions of molded fiberglass conveying expressive features of the holiday motif enhance viewing of the holiday motif both by day and by night.

5 Claims, 4 Drawing Sheets

(56) References Cited

U.S. PATENT DOCUMENTS 6,758,001 B1 * 7/2004 Su ........................... G09F 19/08 40/538
6,769,954 B2 * 8/2004 Su ........................... A63H 13/00 446/353
6,905,229 B2 * 6/2005 Fan ........................... F21S 4/15 362/124
7,048,404 B2 * 5/2006 Pan ........................... D04C 1/02 362/108
7,280,900 B2 11/2007 Teal
7,290,900 B1 * 11/2007 Tsai ........................... A47G 33/06 362/249.14
7,303,313 B1 * 12/2007 Ma ........................... F21V 17/12 362/249.16
7,334,912 B1 * 2/2008 Chung ........................... F21V 17/02 362/124
7,661,847 B2 2/2010 Wang
7,748,866 B2 * 7/2010 Pan ........................... F21S 4/20 362/124
7,748,868 B2 8/2010 Pan
7,789,521 B2 * 9/2010 Li ........................... G09F 19/12 428/113
7,837,351 B2 * 11/2010 Lin ........................... F21V 15/01 362/249.02
7,943,211 B2 5/2011 Chen
8,485,690 B1 * 7/2013 Garcia ........................... F21V 17/007 362/396
8,721,122 B2 5/2014 Tong
8,905,582 B2 * 12/2014 Chan ........................... A47G 33/06 362/249.14
8,960,843 B2 2/2015 Wang
8,960,943 B2 2/2015 Wang
10,184,654 B1 * 1/2019 Chen ........................... F21V 33/0028
2002/0112385 A1 8/2002 Wang
2003/0107888 A1 6/2003 Pan
2004/0042215 A1 * 3/2004 Juan ........................... A47G 33/06 362/362
2004/0095751 A1 * 5/2004 Pan ........................... B44C 5/005 362/124
2004/0100797 A1 5/2004 Yang
2005/0053731 A1 3/2005 Lin
2005/0105288 A1 5/2005 Chen
2005/0157487 A1 * 7/2005 Epstein ........................... G02B 6/0008 362/101
2007/0097685 A1 * 5/2007 Gan ........................... B44C 5/005 362/249.16
2007/0097885 A1 5/2007 Gan
2007/0274071 A1 11/2007 Smith et al.
2007/0291341 A1 12/2007 Pan
2008/0056904 A1 3/2008 Chung
2008/0151569 A1 * 6/2008 Wang ........................... A47G 33/06 362/249.16
2008/0151570 A1 * 6/2008 Lin ........................... 362/249.16
2008/0158904 A1 7/2008 Lai
2008/0170401 A1 7/2008 Li
2008/0198599 A1 8/2008 Lai
2008/0308690 A1 12/2008 Li
2008/0310165 A1 12/2008 Li
2008/0310184 A1 12/2008 Li
2009/0122538 A1 5/2009 Pan
2009/0122539 A1 5/2009 Lai
2009/0213578 A1 * 8/2009 Pan ........................... F21V 5/06 362/124
2012/0094044 A1 4/2012 Hashimoto
2013/0088859 A1 * 4/2013 Wang ........................... F21V 3/04 362/244
2013/0119231 A1 * 5/2013 Asperas ........................... A63H 33/001 249/175

FOREIGN PATENT DOCUMENTS

CN 101799129 A 8/2010
CN 201621522 A 11/2010
CN 201621522 U 11/2010
CN 201944644 A 8/2011
CN 201944644 U 8/2011
DE 2530710 A 7/1975
DE 2530710 A1 1/1977
GB 627546 A 8/1949
GB 2192366 A 1/1988
GB 2252057 A 7/1992
KR 0130641 A 8/1895
KR 20160143950 A 8/2015
KR 20160143950 A 6/2018

* cited by examiner

WIRE-FRAME AND FIBERGLASS HOLIDAY MOTIF

FIELD

This disclosure relates to holiday decorations and, in particular, to holiday decorations suitable for outdoor viewing.

BACKGROUND

Holiday decorations take many forms or "motifs." Certain motifs may be used outside, in either commercial or residential settings, yards, gardens, and the like, and thus can be stand-alone decorations for the property grounds, or may otherwise be significantly sized as to he viewed from afar.

Such outdoor decorations inherently may be visible both during daylight hours as well as at night.

In broad terms, the current state of holiday, garden and yard decorations is to design such decorations with an emphasis on either their daylight viewing or being viewed at night. So, for example, stand alone decorations primarily intended to be viewed during the daytime may assume a three-dimensional form by being formed from blow-molded plastic, to which dye or pigment is added in known manners for the blow-molding process.

Such daytime decorations are often difficult to illuminate, especially with LEDs, or the resulting illumination is unimpressive or otherwise not sufficient or visually pleasing. For example, a central illumination source within the blow molded item is often too defuse to highlight the motif sufficiently for the interested viewer, or makes no more effect than lighting the plastic surface and its associated colors, often with dark spots. Depending on the nature of the polymeric material, insufficient light passes through the polymeric material either because of thickness, lack of illumination, or both.

Various additional attempts have been made to make daytime motifs more expressive at night, but such efforts have fallen far short of overcoming the above-mentioned limitations. For example, certain hollow blow-molded daytime decorations have been equipped with pinpoint or LED lights spaced about some of their surfaces, or may be illuminated by large light sources in their interiors. This approach, however, requires a large amount of light and therefore power to achieve a sufficiently visible and pleasing aesthetic effect, or else falls short of the vibrant, sparkling, and striking pinpoints of light typically expected for nighttime viewing. The result often is limited to a dull glowing plastic form which has limited expressive content visible when illuminated from pinpoint lights or interior lighting.

Decorations or motifs intended primarily for nighttime viewing make use of a plurality of pinpoint lights so as to be seen, and are generally formed of wires shaped into a wire frame resembling the three-dimensional or two-dimensional object being depicted. The lights are secured to the wireframe in sufficient quantity to outline the two- or three-dimensional object and create an aesthetic effect when the lights are turned on and viewed at night.

Oftentimes, when such wireframe decorations, intended for nighttime viewing, are instead viewed during the day, such decorations are devoid of expression, or anthropomorphic detail, consisting mostly of the general two- or three-dimensional shape devoid of character or artistic expression. Although various attempts have been made to make nighttime motifs more aesthetically appealing during the daytime, such efforts have fallen short of achieving the desired decorative or aesthetic effect sought by their creators.

In one approach, the wireframes may have affixed to them metal panels or other solid or substantially opaque portions formed from spun glue or other fibers. While such panels may somewhat improve the monumentality of the motif during the daylight, they do not add significant expression generally; any added expression from such solid portions becomes substantially invisible once night falls; and instead, upon nightfall, the solid portions further diminish and interfere with the magical, sparkling, and striking effect of the pinpoint lights, as the panels block some or all of the pinpoint lights from view when the panels are affixed to the wireframe and viewed at night. Even semi-opaque mesh or fabric adhered to the frame, though providing detail and visibility during the day, dulls and diminishes the effect of a pattern of sparkling pinpoint lights defining the holiday motif.

In a sense, the outdoor holiday motifs intended for night viewing of the current art perform their aesthetic .function optimally only when illuminated at twilight, where both the sparkling effect of any pinpoint lights may be visible, and the remaining daylight allows an interested viewer to still perceive any aesthetic or artistic expression of non-illuminated solid portions.

Accordingly, it would be desirable for outdoor holiday decorations to better address the foregoing drawbacks and disadvantages, and convey an optimal amount of aesthetics and artistic expression both in daylight and at night.

SUMMARY

In one aspect of the disclosure, a holiday motif has a three-dimensional form visible to an interested viewer in proximity thereto. The motif may include a wire frame which has multiple wire members arranged to define the three-dimensional thrill. Pinpoint light sources are arranged and secured to the wire frame at spaced locations. The motif includes one or more fiberglass portions secured to the wire frame, the fiberglass portions having opposite inner and outer surfaces, and a corresponding thickness. The fiberglass portion has been molded so that its outer surface corresponds to a visible feature of the three-dimensional form and the fiberglass portion is secured to the wire frame at a location corresponding to the visible feature defined by the fiberglass portion.

In certain versions of the disclosed embodiments, the thickness of the fiberglass portion has been selected so that it is translucent to a subset of the pinpoint light sources which are proximate to the fiberglass portion. In addition, the light sources are sufficiently numerous so that, collectively, they define a three-dimensional, pinpoint light pattern corresponding to planar surfaces of the motif. The combination of spaced pinpoint light sources on planar surfaces apart from the fiberglass portion, as well as the pinpoint light sources proximate o the fiberglass portion are viewable by the interested viewer under daylight to perceive the holiday motif and also at night when the pinpoint lights are illuminated, in which instance the planar surfaces are visible as the pattern of lights thereon and the visible feature of the fiberglass portion is visible by translucence therethrough.

In this way, aesthetic attributes of the holiday motif, including the fiberglass feature and the pinpoint-light illuminated planar surfaces, are conveyed both by day and by night to the interested viewer. In certain variations of the disclosure, the holiday motif and its three-dimensional form correspond to an animate figure, and the visible feature defined by the fiberglass portion responds to an animate feature of the animate figure. For example, to convey aesthetic qualities, the fiberglass portion defining the animate feature can be a face, an arm, a leg, a hand, footwear, or similar artistic and expressive portions of the animate figure.

In still further variations, multiple fiberglass portions can be secured at respective feature locations on the wire frame of the holiday motif, so that the ensemble of fiberglass portions project multiple artistic and aesthetic attributes of the holiday motif, such as a face, paws or feet, and similar artistic attributes associated with the holiday motif, whether animate or inanimate.

In still a further variation, the fiberglass portions can be mourned to opaque portions secured on the wire frame, and spaced and arranged in a manner so that pinpoint light sources proximate to the fiberglass portions define a feature by silhouette or shadow.

In still further variations, the fiberglass portions can have their thickness vary by engraving selected areas of the fiberglass portion so that the translucence varies at different locations on the fiberglass portion, further conveying artistic and aesthetic details to the interested viewer by different degrees of translucence when the pinpoint lights are illuminated. Similarly, apertures can be defined in the fiberglass portion through which light passes completely, again, defining artistic and aesthetic attributes of the motif at night to the interested viewer, yet surrounding fiberglass portions remaining visible by day.

DETAILED DESCRIPTION

Figure 1:
FIG. 1 shows an isometric view of one suitable implementation of the present disclosure.

Referring now more particularly to the drawings, and in particular to FIG. 1 thereof, a holiday motif 21 includes molded fiberglass portions corresponding to a visible feature of the holiday motif, and formed so as to be translucent when pinpoint light sources in proximity to such fiberglass portion are illuminated. The motif 21 likewise includes exposed wire-frame portions with to which pinpoint light sources are secured and visible to an interested viewer. The combined effect of the translucent fiberglass portions and the planar surfaces defined by the pattern of pinpoint lights secured to the wire frame of the holiday motif enhance the visual effect to an interested viewer both by day and by night, as explained in more detail in this disclosure.

Holiday motif 21 includes a main wire frame 23 shaped to outline holiday motif 21 and sufficiently rigid to support such holiday motif 21. In the illustrated embodiment, the outline of the holiday motif defined by wire frame 23 corresponds to a family of penguins, each having a three dimensional form. A plurality of pinpoint light sources 25 are secured to wire frame 23, and one or more molded fiberglass portions 27 are secured at respective locations on wire frame 23 corresponding to a feature of the holiday motif. In this implementation, multiple fiberglass portions correspond to animate features of the penguin family.

Wire frame 23 may also comprise an optional mesh 24, formed of finer wire or polymeric material, located on the wire frame 23 to partially fill voids between more rigid structural members of wire frame 23. Wire frame 23 and optional mesh 24 are shaped or otherwise configured to correspond to what will be referred to herein as "a surface," sometimes referred to herein as a planar surface as it defines a grid of wires and optional wire mesh which extend in two-dimensional linearly or in arcs, sometimes referred to as "in skeletalized form", and defining a volume of the holiday motif As such, unless the context indicates otherwise, the terms "planar surface" or "surface" include both straight or curving two-dimensionally extending grids of wires, mesh, or solid portions which fully or partially define or enclose a volume of holiday motif 21. Pinpoint light sources 25 are sufficiently numerous to render the volume defined by surfaces of the wire mesh visible and discernable as a surface at night and also by day.

The animate features of the holiday motif 21 defined by molded fiberglass portions 27, in this case, correspond to the laces or the penguin family members, as well as portions of the flippers and feet. Molded fiberglass portions 27 have been formed with thicknesses selected to render such portions partially or completely translucent when lit by a subset of the pinpoint light sources, generally those light sources in sufficient proximity to send light rays outwardly through such molded fiberglass portions 27. As such, secured molded fiberglass portions are in operative proximity to a subset of pinpoint light sources 25, and a suitable thickness of the fiberglass portions 27 is selected to render the fiberglass portions 27 translucent when lit by such pinpoint light sources. A corresponding expressive portion of holiday motif 21 is thereby created, in this case the expression of the penguin family's faces, flippers, and feet.

According to certain implementations, molded fiberglass portions 27 may have varying thicknesses which may be selectively located to create corresponding, varying translucency in expressive portions formed by molded fiberglass portions 27. Although such varying thicknesses may be formed by any suitable technique, including molding operations, varying thicknesses may also be formed by subsequent or contemporaneous engraving of fiberglass during the layup or other molding steps, or thereafter, the resulting process forming engraved portions 29 of lesser thickness than surrounding portions. As a further variation, the molded fiberglass portions 27 may be formed to define one or more apertures 31, which are located to permit light from operatively proximate pinpoint light sources 25 to shine unimpeded therethrough, again transmitting further expressive content to an interested viewer.

The combination of molded fiberglass portions secured in a visible manner to the outer surface of wire frame 23, in certain implementations, involves modifications to the scale of wire frame 23 and/or molded fiberglass portions 27, as well as determinations of what percentage of the visible surface area of holiday motif 21 should be directly viewed as pinpoint light sources secured to wire frame 23 versus molded fiberglass portions. To that end, in the illustrated embodiment, molded fiberglass portions 27, when secured to wire frame 23, do not overlie pinpoint lights on those portions of the wire frame to which the molded fiberglass portions are secured. In other words, in the illustrated implementations, translucency of molded fiberglass portions 27 may be effectuated by receiving light energy from the subset of pinpoint light sources 25 which are at proximate locations on the outer surface defined by the pattern of pinpoint light sources 25, or which may be on opposite outer sides of the volume, such as on back portions of the wire frame shining forward through molded fiberglass portions on the front sides of the holiday motif.

In still other variations, the viewing of the holiday motif 21 both by day and by night is enhanced by having the outer surface area of holiday motif 21 covered by molded fiberglass portions in amounts between 10% and 40% of such total outer surface area. The remaining 60% to 90% of the outer surface area may be a combination of opaque or polymeric portions, or exposed wire frame portions, some or all of the wire frame or opaque portions having pinpoint light sources secured thereto.

In still another variation of the disclosed implementations, the holiday motif and its corresponding main wire frame 23 is sized to have a predetermined scale. However, at the locations on the wire frame where the molded fiberglass portions are to be mounted, the wire frame covered thereby is reduced from the predetermined scale by an amount that is a function of the thickness of the molded fiberglass portion secured at the predetermined location on the wire frame. In this way, the outer surface of the molded fiberglass portion corresponds to the overall predetermined scale of the holiday motif.

In still other variations, the size or complexity or the wire frame associated with holiday motif 21 may be reduced or simplified by the molded fiberglass portions. For example, the molded fiberglass portions may be secured to the outer surface of the wire frame so as to replace the need for wire frame portions at such locations.

In terms of the penguin family illustrated in FIG. 1, then, the necessity to extend the portions of wire frame 23 into beaks 33 has been eliminated by virtue of molded fiberglass portions 27 molded to extend from wire frame 23 and form said beaks 33.

Figure 2:
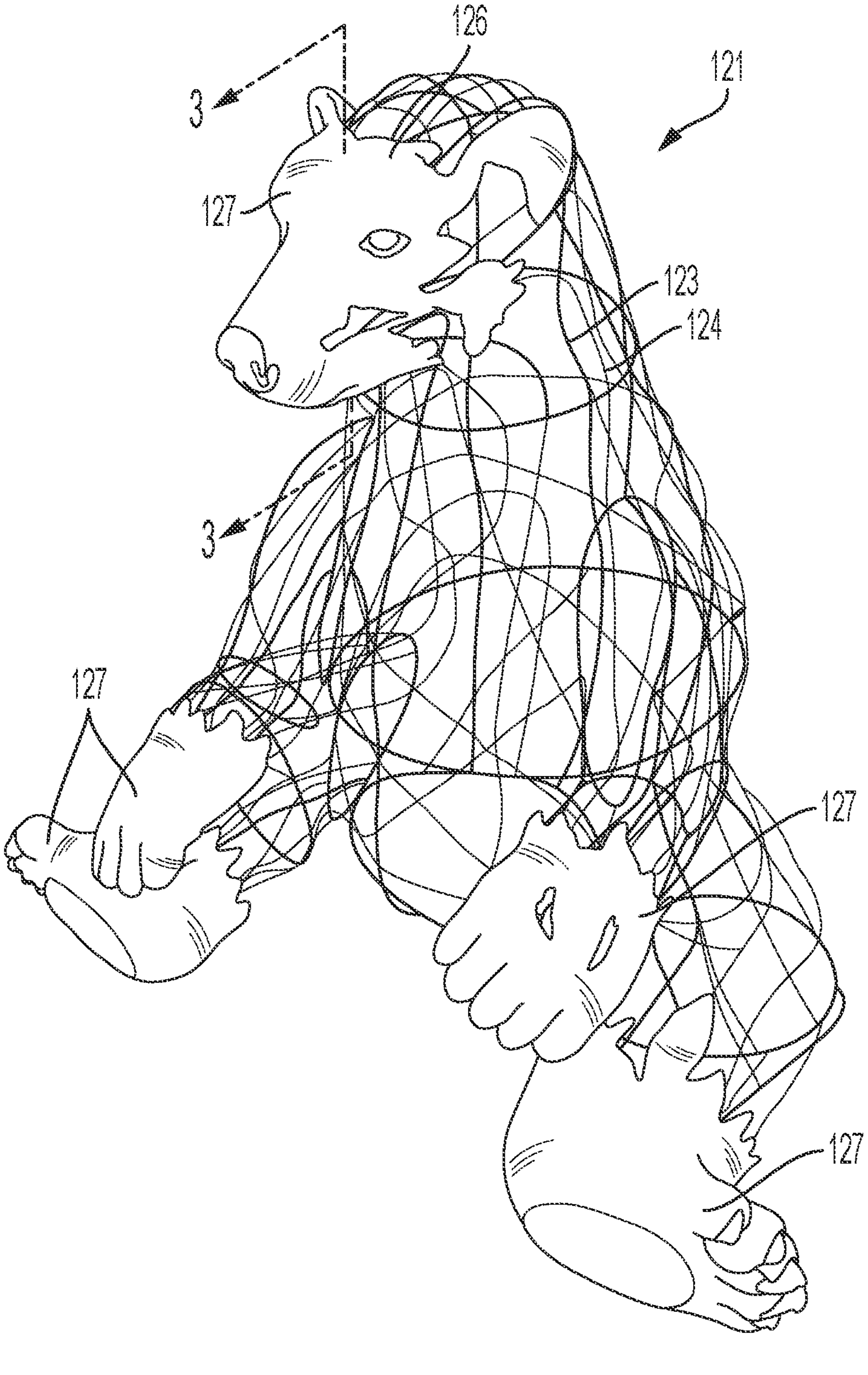
FIG. 2 shows an isometric view of another suitable implementation of the present disclosure, in the form of a seated animate figure of a bear, with animate features formed by fiberglass portions secured to a wire frame.
Figure 3:
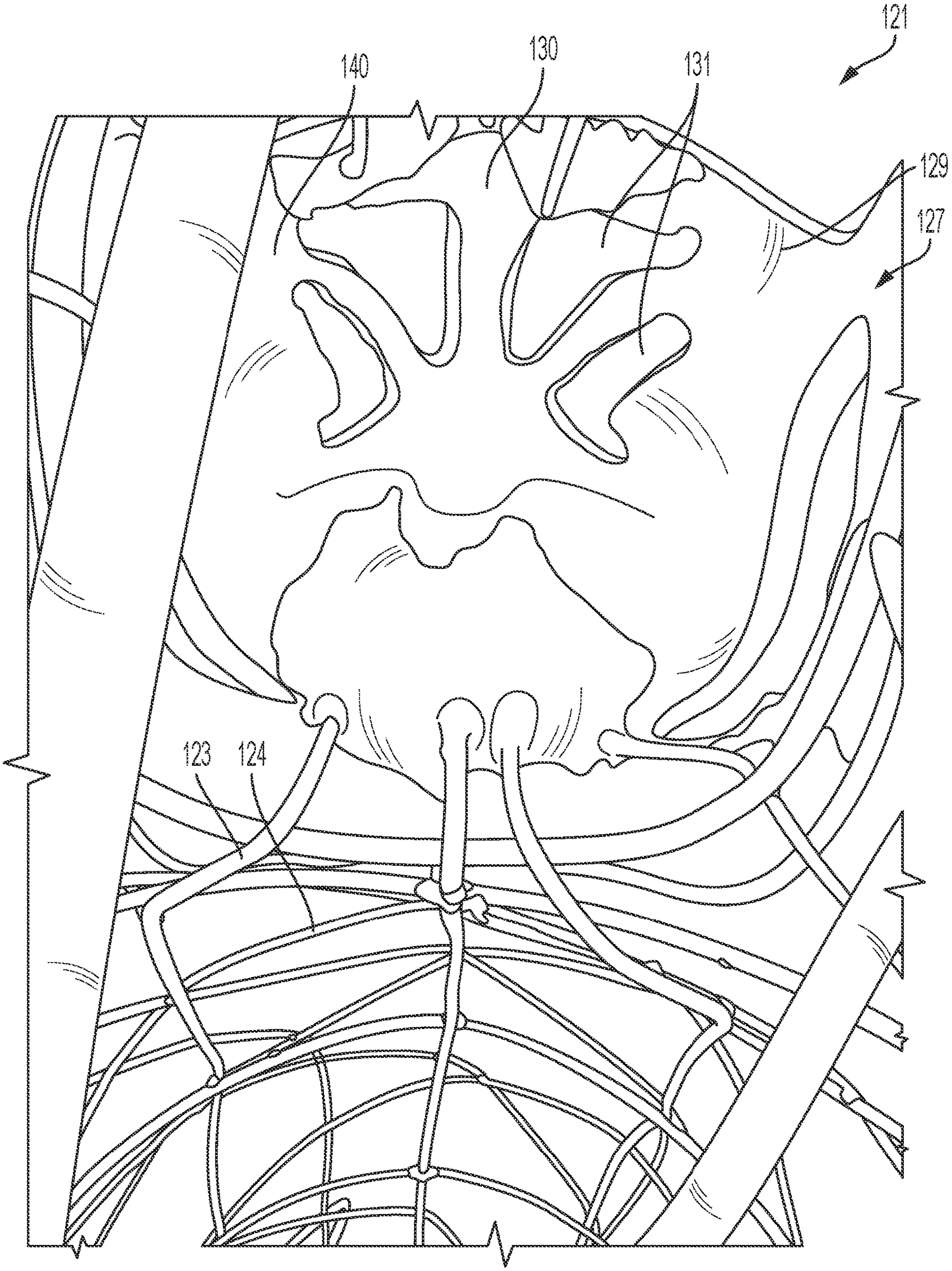
FIG. 3 is a close-up side elevational view of the head of the animate figure of FIG. 2, viewed from the inside forward along line 3-3.

Referring now to FIGS. 2 and 3, another holiday motif 121 is shown in the form of an animate figure, in this case a seated holiday bear. Corresponding reference numbers of holiday motif 21 correspond to the features discussed with reference to the holiday motif illustrated in FIG. 1, such that holiday motif 121 includes a wire frame 123 and optional wire mesh 124 forming an outer surface visible to an interested viewer and enclosing a volume thereby. One or more fiberglass portions 127 are located at respective locations on wire frame 123, in this case corresponding to animate features of the face and paws of the holiday bear. Where molded fiberglass portions 127 are not present, exposed planar surfaces defined by wire frame 123 are equipped with a pattern of pinpoint lights (not shown in FIGS. 2 and 3) but secured in the manner shown and described with reference to the implementation of FIG. 1. As such, as explained with reference to FIG. 1, the holiday motif 121 illustrated in FIGS. 2 and 3 conveys expressive or artistic aspects of the holiday bear when viewed by a viewer by day as well as by night.

Holiday motif 121 includes engraved portions 129 of thickness which is less than that of surrounding areas of the fiberglass molded portion 127, thereby varying translucency when the pattern of lights is illuminated in proximity thereto when light energy shines through the outer surface of molded fiberglass portions 127.

As best seen in FIG. 3, molded fiberglass portion 127 may be secured to wire frame 123 by suitable lamination or lay-up techniques associated with molded fiberglass. Alternately, any other suitable method of securing fiberglass portions 27, 127 to associated wire frames 23, 123 may be employed, including fasteners, zip ties, and the like.

In certain implementations, such as that shown with reference to the embodiments of FIGS. 1-3, the fiberglass portions 37, 137 have outer surfaces characterized by a complex geometry, meaning that the features expressed by the outer surface 26, 126 of the molded fiberglass, especially those corresponding to animate features, include multiple edges corresponding to such animate features. As best seen in the illustrated embodiment of FIGS. 2 and 3, the inner surface 130 of fiberglass portion 127, that is, the surface opposite outer surface 126, defines a concavity 140. Concavity 140 is adapted to be secured to opposing portions of wire frame 123 and is formed of less complex geometry than that characterized by outer surface 126. By configuring inner and outer surfaces 130, 126 in this complementary manner, the portions of wire frame 123 underlying molded fiberglass portions 127 may be formed of simpler geometry, thus making manufacture of frames 23, 123 more efficient and cost-effective.

Figure 4:
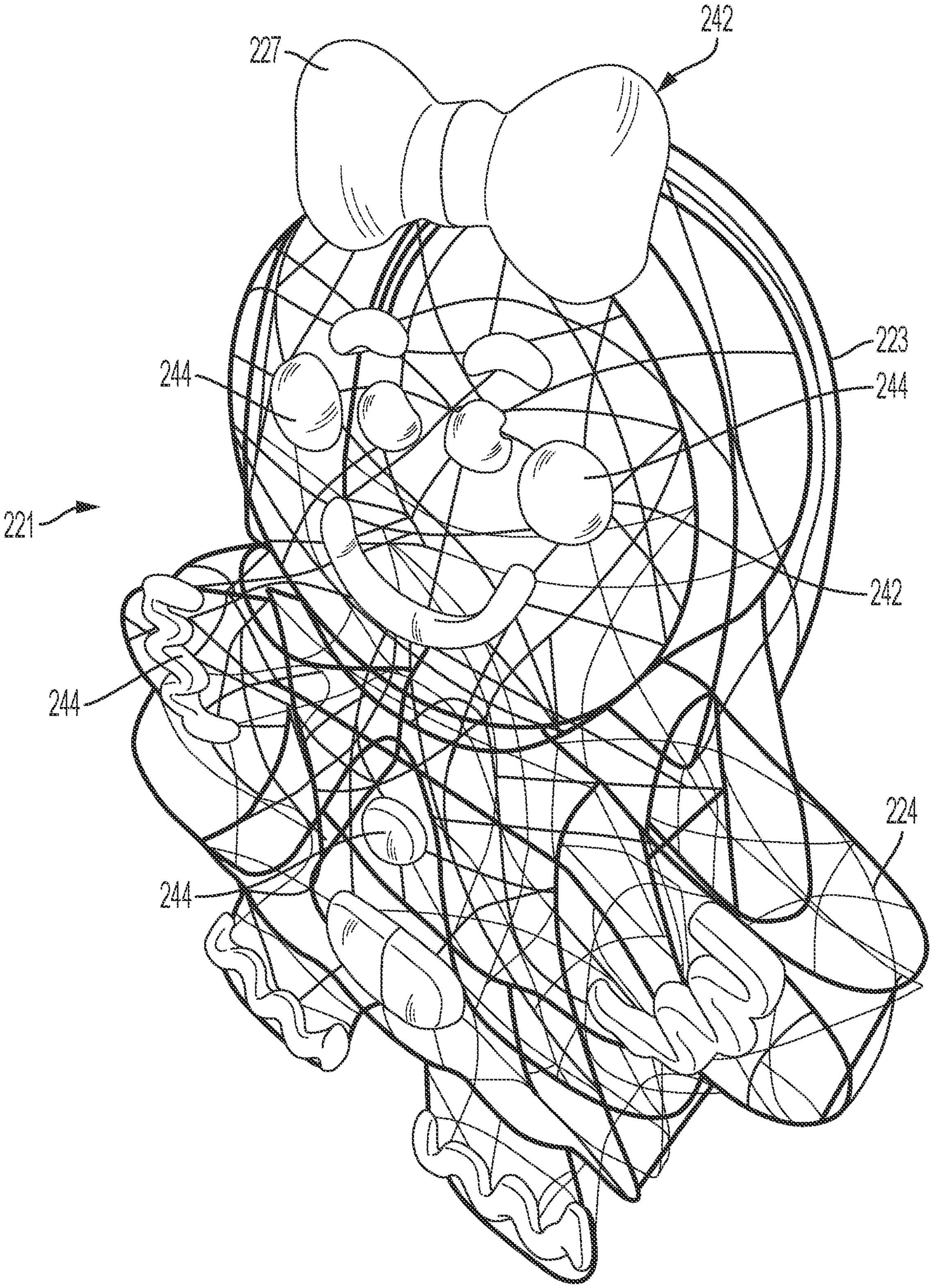
FIG. 4 is an isometric view of another holiday motif in accordance with the present disclosure.

Referring now to FIG. 4, still another lamentation of the present disclosure where corresponding reference numbers referred to corresponding features in the previous embodiments, including fiberglass portions 227, wire frame 223, and wire mesh 224. Again, as in the previous embodiments, a plurality of pinpoint light sources (not shown) is suitably secured to exposed portions of wire frame 223, thereby permitting holiday motif 221 to be visible both by day and by night. In this variation, a plurality of molded fiberglass portions 227 are opaque in nature and located such that their expressive contribution at night by means of silhouette or shadow. In one possible implementation, the opaque molded fiberglass portions 227 have planar inner surfaces fused or otherwise secured to opaque planar portions, made of metal or polymeric material, to form molded fiberglass assemblies. Such molded fiberglass assemblies, shown here as 242 in FIG. 4, are secured to the surface of wire frame 223 at spaced locations to define an array 244 which array 244 in turn corresponds to an animate feature of holiday motif 221. So, as illustrated, the array 244 of molded fiberglass assemblies forms the face and various other typical decorative features of a three-dimensional gingerbread character. The array is located relative to a subset of pinpoint light sources (not shown) to define a silhouette, in this ease that of a gingerbread figure.

A variety of manufacturing techniques associated with design and construction of wire frames 23, 123, 223 for holiday motifs 21, 121, 221 may be employed. The plurality of pinpoint lights 25 may be attached by any suitable methods, including zip ties. Furthermore, the pinpoint lights themselves may comprise any of the known or to-be-developed pinpoint light sources or equivalents, whether arranged individual, in extended-light strings, electroluminescent wire, and the like, and whether providing illumination by LED, incandescent, or other light sources, whether pinpoint or even not pinpoint, which have been developed or to-be-developed.

As disclosed, the holiday decoration or motif optimizes its aesthetic and expressive qualities both during daytime viewing and nighttime viewing. The motif comprises a novel combination of resin/fiberglass portions overlaying a wire-frame shaped to the desired three-dimensional object and equipped with lights along such wireframe. The wireframe defines the overall contour of the figure or decorative item where it is visible; the wire frame may be slightly under-proportioned at selected locations where fiberglass/resin portions are going to be secured, to account for the dimensions (thickness) of the fiberglass/resin portions.

Two different variations of enhanced expressiveness may be accomplished in two types of implementations of the combined wire and fiberglass motifs. In one variation, the fiberglass portions are substantially opaque but their outline and placement itself forms the aesthetic or expressive content. The adjacent lights mounted to the wire frame allow visibility of the fiberglass portions superior to that in the prior art.

In another embodiment, the fiberglass sections have been dimensioned, engraved or provided with apertures such that pinpoint light sources on wireframe portions adjacent to such fiberglass material shine through the fiberglass or through the holes therein to add an enhanced aesthetic or expressive quality.

The expressive fiberglass portions may be provided at respective locations based on any number of cost, efficiency, or artistic criteria, which criteria may have been determined to reduce cost, ease manufacture, or create an improved expressive motif for the viewer both during daylight and nighttime viewing. For example, in the case of holiday decorations corresponding to animate figures, locations of the fiberglass are often determined to have an efficient and artistic effect when used in connection with the animate figures' faces, feet/paws, and other parts that distinguish this particular figure or artistic expression thereof from others. Likewise, apertures may be located as a function of similar expressive effect or highlighting.

The fiberglass has been provided with varying thicknesses, whether by the aforementioned technique of engraving, molding, aperture-formation or by still other techniques which create the desired opacity or translucence, at desired locations, to achieve the desired artistic effect whether by day or by night (or both). Such other techniques may, in some embodiments, include providing color to the resin, or the application of paint to the resin surface. For example, the paint may be applied to certain selected areas to diffuse light or reduce transparency partially or completely, whereas areas adjacent to such selected, colored or painted areas may have increased transmission off light therethrough.

With regard to engraving the fiberglass portions, the location, extent, thickness and other parameters are dependent on the particular design and desired artistic effect day or night. By way of example, in the bear embodiment of FIGS. 2 and 3, thicknesses range from about 1 to 2 mm for engraved portions, with about 1.5 mm being one suitable implementation, and from about 3 to 5 mm for molded portions without engraving, with about 4 mm being on suitable implementation.

The fiberglass portions are preferably laminated to the wireframe, such that there is an exterior layer which has been patterned with the aesthetic or expressive content, and which is on the outer surface of the wireframe, and a suitable backing layer of resin is glued or otherwise fused or adhered to the outer resin layer to form a laminate polyresin polycarbonate structure fused to the aluminum wireframe or solid aluminum portions at the desired location. Suitable wire frames will depend on the particular product dimensions, design and other parameters. For certain outdoor applications, wire frames have aluminum wire ranging in diameters from about 4 mm to about 12 mm at locations where fiberglass portions are designed to be attached.

Suitable lamination steps and materials as described above are followed to make the holiday motifs sufficiently durable for their intended applications and locations, especially for potential use outdoors over multiple years. The resin, as applied, maintains the fiberglass secured to the aluminum of the wireframe or solid portions.

Alternative means of affixing the fiberglass portions to the frame are contemplated, such as glue, cable ties, or any other suitable fasteners.

For those embodiments where light does not pass through the fiberglass materials, but instead its aesthetic effect by silhouette or surrounding the fiberglass portions, a metal (aluminum) layer may be provided to which the outer and inner layers of the resin may be secured in a "sandwich" configuration about the aluminum planar material.

Although the exact proportion of illuminated wireframe and overlying resin max be varied, many preferred decorations optimizing both daytime and nighttime viewing comprise 75% exposed wireframe lighted portions and 25% fiberglass portions illuminated by adjacent lights from the wireframe.

In a related method of manufacture, the desired decoration is fully formed as a molded form, which would be generally hollow in the case of a three-dimensional motif. Such three-dimensional fiberglass mold may be provided with engraved thicker and thinner portions, paint, and other highly expressive detailing.

Thereafter, in the inventive process, the more expressive or artistic portions of such mold are determined and a slightly underproportioned wireframe is devised for just those portions to which the expressive fiberglass portions will be affixed. The underproportionment of the frame at fiberglass mounting locations depends on the frame location on which the fiberglass portion is being secured. So, for example, the fiberglass face of the holiday motif of FIGS. 2 and 3, if protruded about 6 mm overall, would have the underlying wireframe reduced correspondingly. If the corresponding head of the motif of FIGS. 2 and 3 extended back to front approximately 150 mm, then the underproportionment can be expressed as a percentage of reduction of the head size by about 4 or 5 percent. The wire frame outside of such fiberglass portions is to scale, as it will not have an outer fiberglass layer thereon.

In this way, the fiberglass portions are limited to those highly expressive or highly important for the viewer to appreciate the decoration during the daytime, including expressive content best viewed during daylight hours, and the wireframe forms the balance of the volume of the decoration both during the daytime and with striking effect by virtue of illumination at night.

The above described manufacturing processes are exemplary only. Another variation could be to remove alternating portions of a fiberglass three-dimensional mold, such as alternating stripes of a candy cane or similar items, and achieving a combination of silhouetted forms during nighttime viewing but also alternating colored forms during the daytime.

In another suitable method of making the wire frame and fiberglass holiday motif the method includes the following steps:

- Creating a fiberglass mold corresponding to a three-dimensional form of a holiday, motif, the three-dimensional form including animate features;
- Laying-up fiberglass in at least a portion of the fiberglass mold, including at least one of the animate features, and there forming a laid-up fiberglass object;
- Part of the method involves determining the specifications of the wire frame, including its dimensions, and then selecting portions of the laid-up fiberglass object corresponding to one or more of the animate features to be provided on the holiday motif;

Thereafter, the location of the fiberglass portions on the wire frame is determined;

The determination of the dimensions of the wire frame may include reducing the scale of the wire frame at those locations corresponding to molded fiberglass portions to be secured to the wire frame such that the added thickness of the fiberglass portions maintains the overall scale of the holiday motif;

The advantages of the foregoing implementations and disclosure are readily apparent from the preceding description. The viewing of a holiday motif and its aesthetic and expressive attributes is enhanced both for day viewing and night viewing by including one or more portions of translucent, molded fiberglass at locations corresponding to portions of the holiday motif which would benefit from artistic or aesthetic content. Such portions can include animate features of the holiday motif, such as an expressive face, limbs, hands, and various other equivalent features in the animal or holiday pantheon of motifs;

Exposed pinpoint light patterns on wire frame portions adjacent to the fiberglass portions not only provide a supporting visible planar surface visible to the outside viewer, but such lighting also shines through the translucent portions of the fiberglass such that both the sparkling planar surfaces of the holiday motif and the expressive fiberglass portions are perceptible and expressive by night; and Manufacture of the holiday motif is made more cost effective and efficient by molding out of fiberglass portions of the holiday motif which would otherwise be formed of wire mesh. This is particularly advantageous for portions of the holiday motif having complex geometries, which would be more costly to form by wire framing and which are advantaged by fiberglass molding not only in terms of cost but in terms of ease of incorporating expressive content o such complex geometries.

The foregoing description and implementations are meant to be exemplary only, and it will be appreciated if further variations to the foregoing are within the spirit and scope of this disclosure, which is further defined by the claims appended hereto.

What is claimed is:

1. A holiday motif comprising:

a main wire frame shaped to outline the holiday motif to support the holiday motif;

a mesh located on the wire frame and configured to partially fill voids of the wire frame to convey to any interested viewer a surface defining a volume of the holiday motif;

a plurality of pinpoint light sources secured to the volume defined by the wire frame and mesh, the pinpoint light sources to render the volume visible at night;

a molded fiberglass portion secured to the wire frame at a predetermined location corresponding to an animate feature of the holiday motif;

wherein the holiday motif comprises a plurality of the molded fiberglass portions, and further comprises an animate figure having a head;

wherein a first one of the molded fiberglass portions is secured at a location corresponding to the head of the holiday motif and is configured to correspond to a face;

wherein other ones of the molded fiberglass portions are secured at locations on the surface corresponding to animated features selected from the group consisting of arms, legs, hands, feet, paws, and hooves;

wherein the molded fiberglass portions have corresponding outer perimeters;

wherein the holiday motif further comprises opaque planar portions sized to correspond to the outer perimeters of the molded fiberglass portions;

wherein the molded fiberglass portions are fused to corresponding ones of the opaque planar portions to form opaque, molded fiberglass assemblies;

wherein the opaque molded fiberglass assemblies are secured to the surface of the holiday motif at spaced locations to define an array, the array corresponding to the animate feature; and wherein the array is located relative to a subset of the pinpoint light sources to define a silhouette of the animated feature.

2. The holiday motif of claim 1, wherein the surface of the holiday motif comprises a total, outer surface area, the outer surface area further comprising a first outer surface area covered by the molded fiberglass portion and a second outer surface area having the pinpoint light sources thereon visible to the interested viewer.

3. The holiday motif of claim 2, wherein the fiberglass portion has opposite inner and outer molded surfaces, the inner and outer molded surfaces separated from each other by a distance corresponding to the predetermined thickness of the molded fiberglass portion, the inner molded surface secured at the predetermined location on the wire frame;

wherein the holiday motif is sized to have a predetermined scale;

wherein the predetermined location of the wire frame covered by the molded fiberglass portion is reduced from the predetermined scale by an amount that is a function of the thickness of the molded fiberglass portion secured at the predetermined location;

whereby the outer surface of the molded fiberglass portion corresponds to the predetermined scale.

4. The holiday motif of claim 3, wherein the animate feature is defined by the outer surface of the molded fiberglass portion, the outer surface of the molded fiberglass portion extending outwardly from adjacent portions of the wire frame and defining the total, outer surface area of the holiday motif, the outer surface of the molded fiberglass portion thereby reducing the size of the wire frame.

5. The holiday motif of claim 2, wherein the first outer surface area covered by the molded fiberglass portion comprises between about 10% and about 40% of the total, outer surface area;

whereby both the animate feature of the molded fiberglass portion and the second outer surface area having the pinpoint light sources visible thereon are visible when the pinpoint light sources are illuminated without further illumination at night.

* * * * *